(12) United States Patent
Xu et al.

(10) Patent No.: US 10,170,968 B2
(45) Date of Patent: Jan. 1, 2019

(54) VIBRATION MOTOR

(71) Applicants: Hongfu Xu, Shenzhen (CN); Zhilin Chai, Shenzhen (CN); Na Wu, Shenzhen (CN); Fanghua Ling, Shenzhen (CN)

(72) Inventors: Hongfu Xu, Shenzhen (CN); Zhilin Chai, Shenzhen (CN); Na Wu, Shenzhen (CN); Fanghua Ling, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 249 days.

(21) Appl. No.: 15/256,857

(22) Filed: Sep. 6, 2016

(65) Prior Publication Data

US 2017/0133918 A1  May 11, 2017

(30) Foreign Application Priority Data

Nov. 10, 2015  (CN) .................... 2015 2 0890490 U

(51) Int. Cl.
*H02K 33/16* (2006.01)
*H02K 33/02* (2006.01)
*B06B 1/04* (2006.01)

(52) U.S. Cl.
CPC ............. *H02K 33/02* (2013.01); *B06B 1/045* (2013.01); *H02K 33/16* (2013.01)

(58) Field of Classification Search
CPC ............................. H02K 35/02; H02K 33/00
USPC ................................................. 310/36–37, 15
See application file for complete search history.

(56) References Cited

U.S. PATENT DOCUMENTS

| 8,242,642 | B2 * | 8/2012 | Odajima | H02K 33/16 |
| | | | | 310/15 |
| 8,334,624 | B2 * | 12/2012 | Dong | H02K 33/16 |
| | | | | 310/13 |
| 8,456,042 | B2 * | 6/2013 | Dong | H02K 33/16 |
| | | | | 310/15 |
| 8,624,450 | B2 * | 1/2014 | Dong | H02K 33/16 |
| | | | | 310/15 |
| 8,648,502 | B2 * | 2/2014 | Park | H02K 33/16 |
| | | | | 310/15 |
| 8,878,401 | B2 * | 11/2014 | Lee | H02K 33/16 |
| | | | | 310/15 |
| 9,024,489 | B2 * | 5/2015 | Akanuma | H02K 33/16 |
| | | | | 310/15 |
| 9,306,429 | B2 * | 4/2016 | Akanuma | H02K 5/24 |
| 2009/0267423 | A1 * | 10/2009 | Kajiwara | H02K 33/02 |
| | | | | 310/36 |
| 2011/0266892 | A1 * | 11/2011 | Wauke | B06B 1/045 |
| | | | | 310/25 |

(Continued)

*Primary Examiner* — Alexander Talpalatski
(74) *Attorney, Agent, or Firm* — Na Xu; IPro, PLLC

(57) ABSTRACT

A vibration motor is disclosed. The vibration motor includes a housing having a receiving space; a vibration unit accommodated in the receiving space, the vibration unit including a main weight, a main pole plate, and a main magnet carried by the main pole plate, the main weight comprising a first weight, and a second weight opposed to and apart from the first weight; and a plurality of elastic members suspending the vibration unit in the receiving space. The main magnet is sandwiched between the first and second weights, and two ends of the main pole plate are respectively connected to the first weight and the second weight.

11 Claims, 4 Drawing Sheets

(56) References Cited

U.S. PATENT DOCUMENTS

| | | | |
|---|---|---|---|
| 2012/0049660 A1* | 3/2012 | Park | B06B 1/045 310/25 |
| 2013/0169072 A1* | 7/2013 | Oh | B06B 1/045 310/36 |
| 2013/0221767 A1* | 8/2013 | Akanuma | H02K 33/02 310/15 |

* cited by examiner

VIBRATION MOTOR

FIELD OF THE INVENTION

The present disclosure is related to vibration motors, specifically related to a vibration motor for portable consumer electronic products.

DESCRIPTION OF RELATED ART

A vibration motor is applied to feedback of system generally, for example, incoming call prompt, message prompt and navigation prompt of mobile phone, vibration feedback of game player, etc. for portable consumer electronic products, such as mobile phone, handheld game player, navigation unit or handheld multimedia entertainment equipment which is more and more popular with people along with the development of the electronic technique.

A related vibration motor includes a housing having a receiving space, a vibration unit accommodated in the receiving space, and a plurality of elastic members for suspending the vibration unit in the housing. The vibration unit includes a weight, a magnet, and a pole plate. The weight forms a through hole for accommodating the magnet therein. The pole plate attaches to a surface of the magnet. The hardness of the weight is so high that it is difficult to form the through hole in the weight. Further, due to the through hole in the weight, the stiffness of the weight is badly decreased, which will badly affect the vibration performance of the vibration motor.

Therefore, an improved vibration motor which can overcome the problems mentioned above is accordingly desired.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

Figure 1:
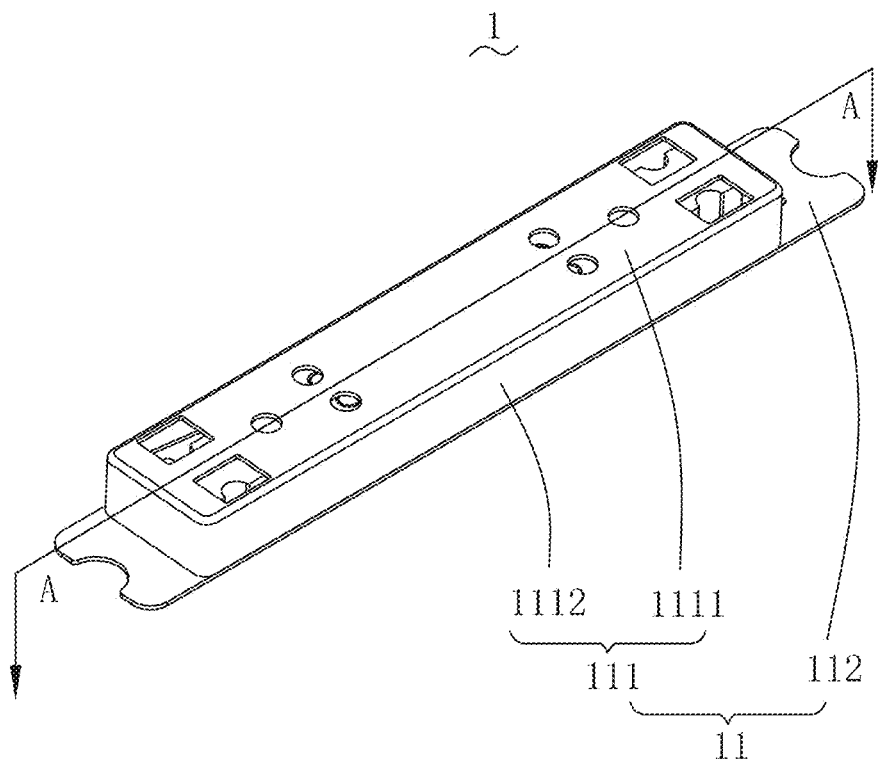
FIG. 1 is an isometric view of a vibration motor in accordance with an exemplary embodiment of the present disclosure.
Figure 2:
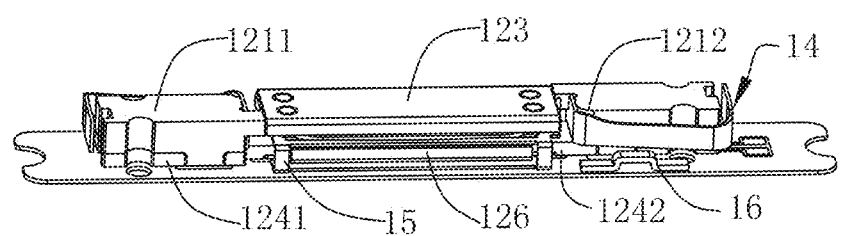
FIG. 2 is an assembled view of the vibration motor in FIG. 1, wherein a housing thereof is removed.

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Referring to FIGS. 1-7, a vibration motor 1, in accordance with an exemplary embodiment of the present disclosure, comprises a housing 11 having a receiving space, a vibration unit 12 accommodated in the receiving space of the housing 11, a coil 13, a plurality of elastic members 14 received in and connected to the housing 11, a fixing frame 15, a plurality of restricting block 16 fixed to the housing 11, and a flexible printed circuit board (FPCB) 17 electrically connected to the coil 13. The elastic members 14 suspend the vibration unit 12 in the receiving space of the housing 11.

Referring to FIG. 1, the housing 11 includes a shell 111 and a cover 112 engaging with the shell 111 for forming the receiving space. The shell 111 includes a bottom wall 1111 and a sidewall 1112 extending perpendicularly from the bottom wall 1111.

Referring to FIGS. 2-6, the elastic member 14 includes a connecting end 141 connected to the vibration unit 12, an elastic arm 142 extending from the connecting end 141, and a fixing end 143 extending from the elastic arm 142 for connecting to the shell 111. Thus, the vibration unit 12 is suspended in the receiving space by the elastic members 14. The restricting blocks 16 are mounted on the cover 112 and below the vibration unit 12 for preventing the vibration unit from contacting with the cover.

The vibration unit 12 includes a main weight 121, a main magnet 122, a main pole plate 123, an auxiliary weight 124, an auxiliary magnet 125, and an auxiliary pole plate 126. The main weight 121 includes a first weight 1211 and a second weight 1212 parallel to and apart from the first weight 1211. Each of the first and second weights 1211, 1212 forms a slot 1213 adjacent to the main magnet 122. The slots 1213 extend along a direction perpendicular to the vibration direction of the vibration unit. The connecting end 141 of the elastic member 14 engages with the slot 1213 for fixing the connecting end 141 to the vibration unit 12. The main magnet 122 is sandwiched between the first weight 1211 and the second weight 1212.

Figure 3:
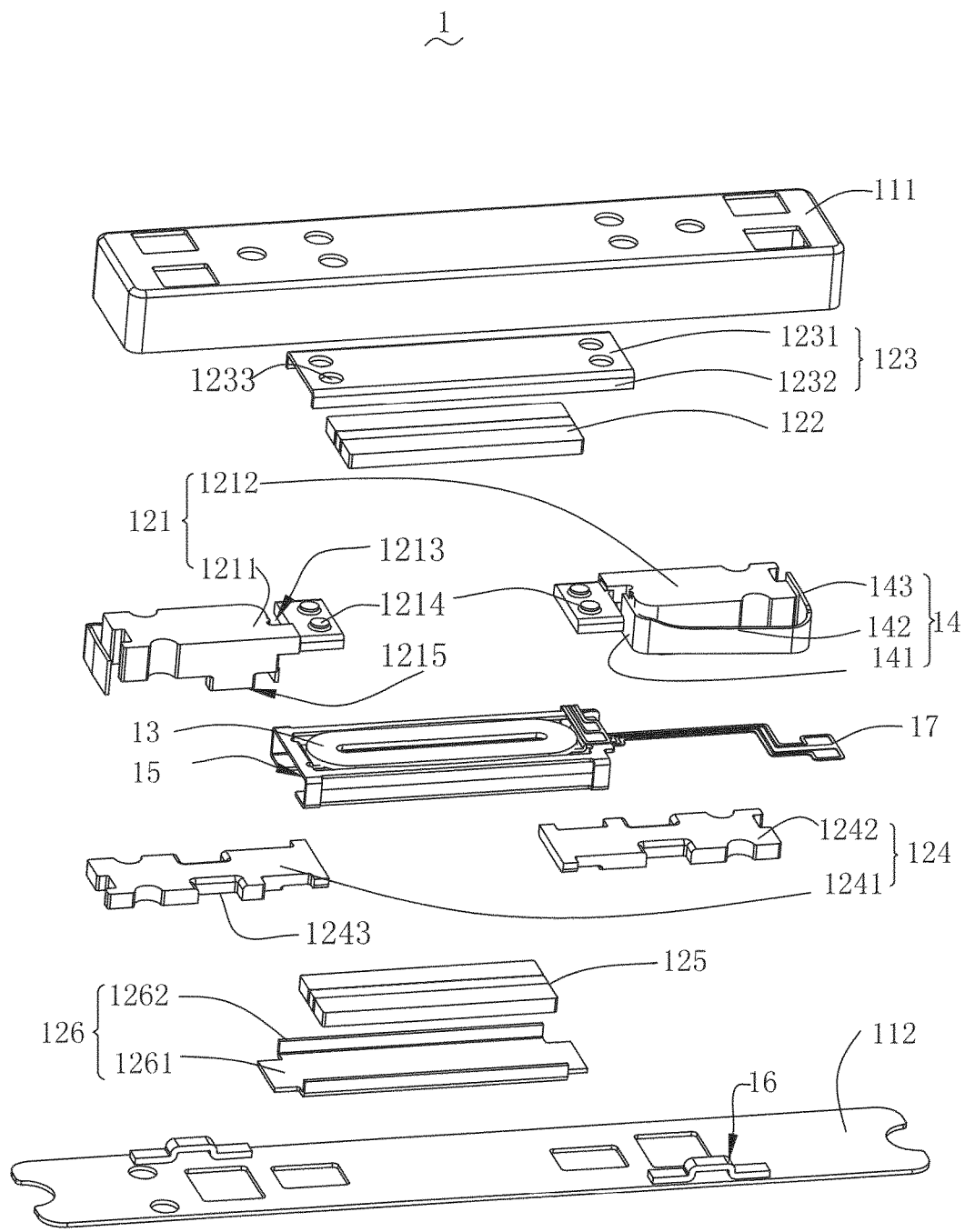
FIG. 3 is an exploded view of the vibration motor in FIG. 1.
Figure 4:
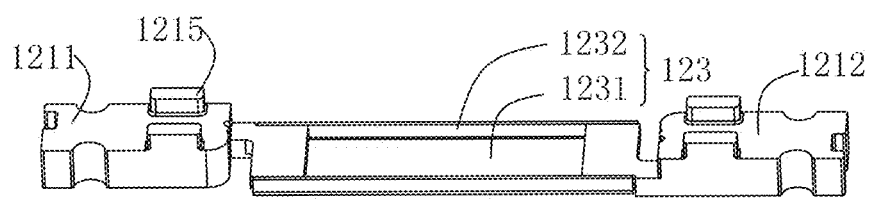
FIG. 4 is an assembled view of a combination of a main pole plate, a first weight, and a second weight of the vibration motor.

Referring to FIGS. 3-4, the main pole plate 123 includes a main cap 1231 and a pair of main sides 1232 extending downwardly from two opposed edges of the main cap 1231. The main cap 1231 attaches to the main magnet 122 adjacent to the housing 11, and two ends of the main cap 1231 respectively connected to the first and second weights 1211, 1212. The main magnet 122 is sandwiched and positioned by the main sides 1232. In addition, the main cap 1231 forms a pair of first positioning grooves 1233, and the first and second weights 1211, 1212 form a positioning protrusion 1214 respectively. The engagement between the positioning grooves 1233 and the positioning protrusions 1214 enhances the connection reliability between the weights, the magnet, and the main pole plate 123.

Figure 5:
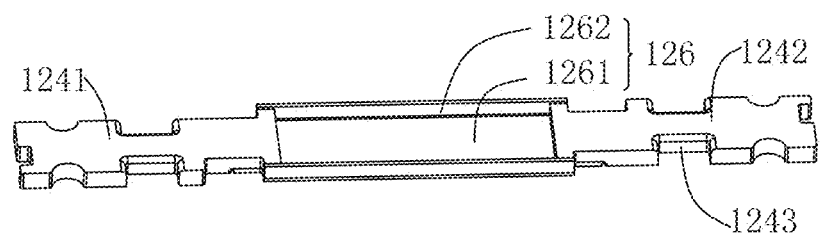
FIG. 5 is an assembled view of a combination of an auxiliary pole plate, a third weight, and a fourth weight of the vibration motor.
Figure 6:
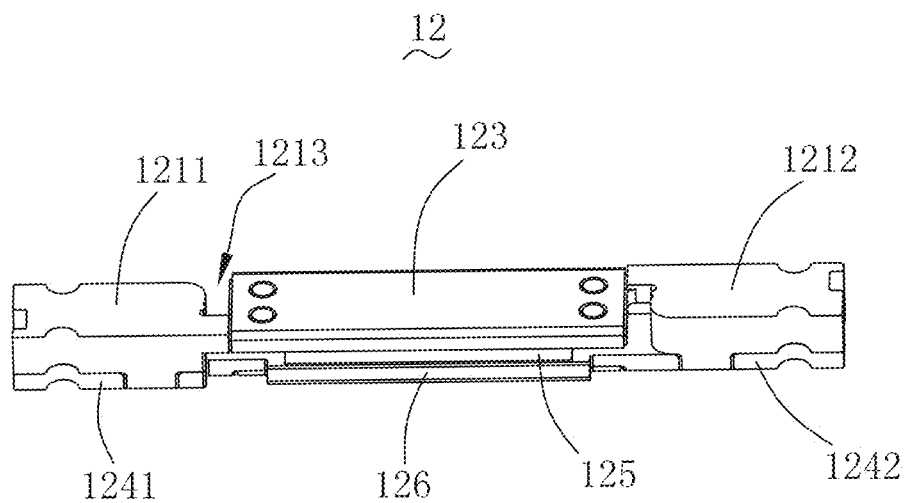
FIG. 6 is an isometric view of a vibration unit of the vibration motor in FIG. 1.

Referring to FIG. 3 and FIG. 5, the auxiliary weight 124 comprises a third weight 1241, and a fourth weight 1242 opposed to and apart from the third weight 1241. The auxiliary magnet 125 is sandwiched between the third weight 1241 and the fourth weight 1242.

The auxiliary pole plate 126 includes an auxiliary cap 1261 and a pair of auxiliary sides 1262 extending from two opposed edge of the auxiliary cap 1261. The auxiliary cap 1261 attaches to the auxiliary magnet 125 adjacent to the housing 11, and two ends of the auxiliary cap 1261 respectively connected to the third and fourth weights 1241, 1242. The auxiliary magnet 125 is sandwiched and positioned by the auxiliary sides 1262.

Referring to FIGS. 4-5, the main weight 121 has a plurality of plugs 1215, and correspondingly, the auxiliary weight 124 comprises a plurality of receptacles 1243. By virtue of the engagement between the plugs 1215 and the receptacles 1243, the main weight 121 is stacked on the auxiliary weight 124. In detail, the first weight 1211 is stacked on the third weight 1241 by the engagement between the plugs and the receptacles formed on the first weight and the third weight. The second weight 1212 is stacked on the fourth weight 1242 by the engagement between the plugs and the receptacles formed on the second weight and the fourth weight. Of course, the plugs could also be arranged on the auxiliary weight, and the receptacles could also be arranged on the main weight. Alternatively, the main weight could form a plug and a receptacle, and at the same time, the auxiliary weight forms a receptacle and a plug corresponding to the main weight. When the main weight is stacked on the auxiliary weight, a magnetic gap G0 is accordingly formed between the main magnet and the auxiliary magnet.

Figure 7:
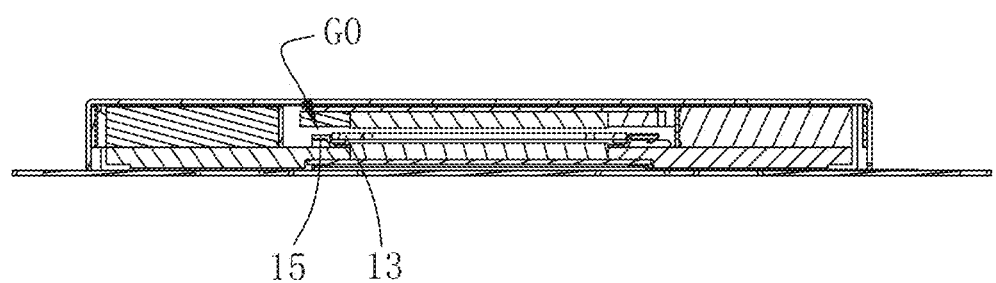
FIG. 7 is a cross-sectional view of the vibration motor taken along Line A-A in FIG. 1.

Referring to FIG. 7, together with FIG. 3, the coil 13 is located in the magnetic gap G0 formed between the main magnet 122 and the auxiliary magnet 125 and is supported by the fixing frame 15.

By virtue of the configuration between the main weight, the auxiliary weight, the main magnet, the auxiliary magnet, the main pole plate and the auxiliary pole plate, no through hole is needed to positioning the magnets, which enhance the stiffness of the weights. The main pole plate is used for connecting the first weight and the second weight, and the auxiliary pole plate is used for connecting the third weight and the fourth weight, which also enhances the strength of the pole plates, and further enhances the connection stability between the weights and the magnets.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, comprising:
a housing having a receiving space;
a vibration unit accommodated in the receiving space, the vibration unit including a main weight, a main pole plate, a main magnet carried by the main pole plate, an auxiliary weight, an auxiliary pole plate, and an auxiliary magnet carried by the auxiliary pole plate, the main weight comprising a first weight, and a second weight opposed to and apart from the first weight;
a plurality of elastic members suspending the vibration unit in the receiving space; wherein
the main magnet is sandwiched between the first and second weights, and two ends of the main pole plate are respectively connected to the first weight and the second weight.

2. The vibration motor as described in claim 1, wherein the auxiliary weight further includes a third weight and a fourth weight opposed to and apart from the third weight for sandwiching the auxiliary magnet between the third and fourth weights.

3. The vibration motor as described in claim 2, wherein two ends of the auxiliary pole plate are respectively connected to the third weight and the fourth weight.

4. The vibration motor as described in claim 2, wherein the first weight stacks on the third weight, and the second weight stacks on the fourth weight.

5. The vibration motor as described in claim 4, wherein one of the main weight and the auxiliary weight forms a plurality of plugs, and another of the main weight and the auxiliary weight forms a plurality of receptacles corresponding to the plugs for engaging the main weight and the auxiliary weight.

6. The vibration motor as described in claim 1, wherein the main pole plate forms a plurality of first positioning grooves, the main weight forms a plurality of first positioning protrusions corresponding to the first positioning grooves, and the engagements between the first positioning grooves and the first positioning protrusions secure the main pole plate to the main weight.

7. The vibration motor as described in claim 1, wherein the auxiliary pole plate forms a plurality of second positioning grooves, the auxiliary weight forms a plurality of second positioning protrusions corresponding to the second positioning grooves, and the engagements between the second positioning grooves and the second positioning protrusions secure the auxiliary pole plate to the auxiliary weight.

8. The vibration motor as described in claim 1, wherein the main pole plate includes a main cap connected with the main weight, and a main side extending from two opposed edges of the main cap for carrying the main magnet.

9. The vibration motor as described in claim 1, wherein the auxiliary pole plate includes an auxiliary cap connected with the auxiliary weight, and an auxiliary side extending from two opposed edges of the auxiliary cap for carrying the auxiliary magnet.

10. The vibration motor as described in claim 1 further including a magnetic gap between the main magnet and the auxiliary magnet.

11. The vibration motor as described in claim 10 further including a coil received in the magnetic gap and supported by a fixing frame.

\* \* \* \* \*